United States Patent
Dubay et al.

(10) Patent No.: US 11,440,578 B2
(45) Date of Patent: Sep. 13, 2022

(54) ENERGY ABSORPTION STRAP ASSEMBLY WITH METAL BREAKAWAY FEATURE

(71) Applicant: Steering Solutions IP Holding Corporation, Saginaw, MI (US)

(72) Inventors: Kurt D. Dubay, Merrill, MI (US); Anthony R. Talhelm, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/157,604

(22) Filed: Jan. 25, 2021

(65) Prior Publication Data

US 2022/0126907 A1     Apr. 28, 2022

Related U.S. Application Data

(60) Provisional application No. 63/105,545, filed on Oct. 26, 2020.

(51) Int. Cl.
*B62D 1/19*     (2006.01)
*F16F 7/12*     (2006.01)

(52) U.S. Cl.
CPC ............ *B62D 1/192* (2013.01); *B62D 1/195* (2013.01); *F16F 7/123* (2013.01); *F16F 7/126* (2013.01); *F16F 7/128* (2013.01)

(58) Field of Classification Search
CPC .......... B62D 1/19; B62D 1/192; B62D 1/195; B62D 1/197; F16F 7/123; F16F 7/125; F16F 7/126; F16F 7/128; F16F 7/12
USPC ........................................................ 280/777
See application file for complete search history.

(56) References Cited

U.S. PATENT DOCUMENTS

2012/0024101 A1*  2/2012  Schnitzer ............... B62D 1/195
                                                              74/492
2016/0244015 A1*  8/2016  Dubay .................... B60R 21/02

* cited by examiner

*Primary Examiner* — Keith J Frisby
(74) *Attorney, Agent, or Firm* — Dickinson Wright PLLC

(57) ABSTRACT

A steering column assembly includes a lower jacket. The steering column assembly also includes an upper jacket in telescoping engagement with the lower jacket. The steering column assembly further includes an energy absorbing strap assembly operatively coupled to the upper jacket. The energy absorbing strap assembly includes a strap having a stationary leg and a moveable leg connected by a curved portion to form a substantially U-shape. The energy absorbing strap assembly also includes a metal pin extending through the stationary leg and the moveable leg.

18 Claims, 2 Drawing Sheets

ENERGY ABSORPTION STRAP ASSEMBLY WITH METAL BREAKAWAY FEATURE

CROSS-REFERENCE TO RELATED APPLICATION

This patent application claims the benefit of priority to U.S. Provisional Patent Application Ser. No. 63/105,545, filed Oct. 26, 2020, which is incorporated by reference herein in its entirety.

FIELD OF THE INVENTION

The embodiments described herein relate to vehicle steering systems and, more particularly, to an energy absorption strap assembly with a metal rivet breakaway feature.

BACKGROUND

A steering column assembly of a vehicle may include one or more energy absorption features. For example, an energy absorption strap (E/A strap) assembly may be operatively coupled to an upper jacket and configured to unroll once a specified collapse load is exceeded. On adjustable steering columns, energy absorbing straps are utilized to absorb an occupant's mass during a collapse event of the steering column.

A plastic breakaway pin may be pressed into the E/A strap to satisfy a low initial breakaway load requirement for the energy absorbing system on steering columns. However, a plastic pin that is pressed through one portion of the E/A strap may result in breakaway at too low of a load for many applications. For example, the pin may breakaway at a load of less than 500 N, or even less than 100 N.

SUMMARY

According to one aspect of the disclosure, a steering column assembly includes a lower jacket. The steering column assembly also includes an upper jacket in telescoping engagement with the lower jacket. The steering column assembly further includes an energy absorbing strap assembly operatively coupled to the upper jacket. The energy absorbing strap assembly includes a strap having a stationary leg and a moveable leg connected by a curved portion to form a substantially U-shape. The energy absorbing strap assembly also includes a metal pin extending through the stationary leg and the moveable leg.

According to another aspect of the disclosure, a steering column assembly includes a lower jacket. The steering column assembly also includes an upper jacket in telescoping engagement with the lower jacket. The steering column assembly further includes an energy absorbing strap assembly operatively coupled to the upper jacket. The energy absorbing strap includes a strap having a stationary leg and a moveable leg connected by a curved portion to form a substantially U-shape. The energy absorbing strap also includes a metal rivet extending through the stationary leg and the moveable leg, wherein the metal rivet does not extend into the upper jacket.

According to yet another aspect of the disclosure, an energy absorbing strap assembly for a vehicle steering system, the energy absorbing strap assembly includes a strap having a stationary leg and a moveable leg connected by a curved portion to form a substantially U-shape. The energy absorbing strap also includes a metal pin extending through the stationary leg and the moveable leg.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated are embodiments relating to an energy absorbing assembly associated with a steering column (also referred to herein as a "steering column assembly"). The energy absorbing assembly includes a metal rivet breakaway feature that fractures at a 1200 N to 1800 N load prior to the energy absorption assembly being activated. The steering column may be utilized in numerous types of vehicles.

Figure 1:
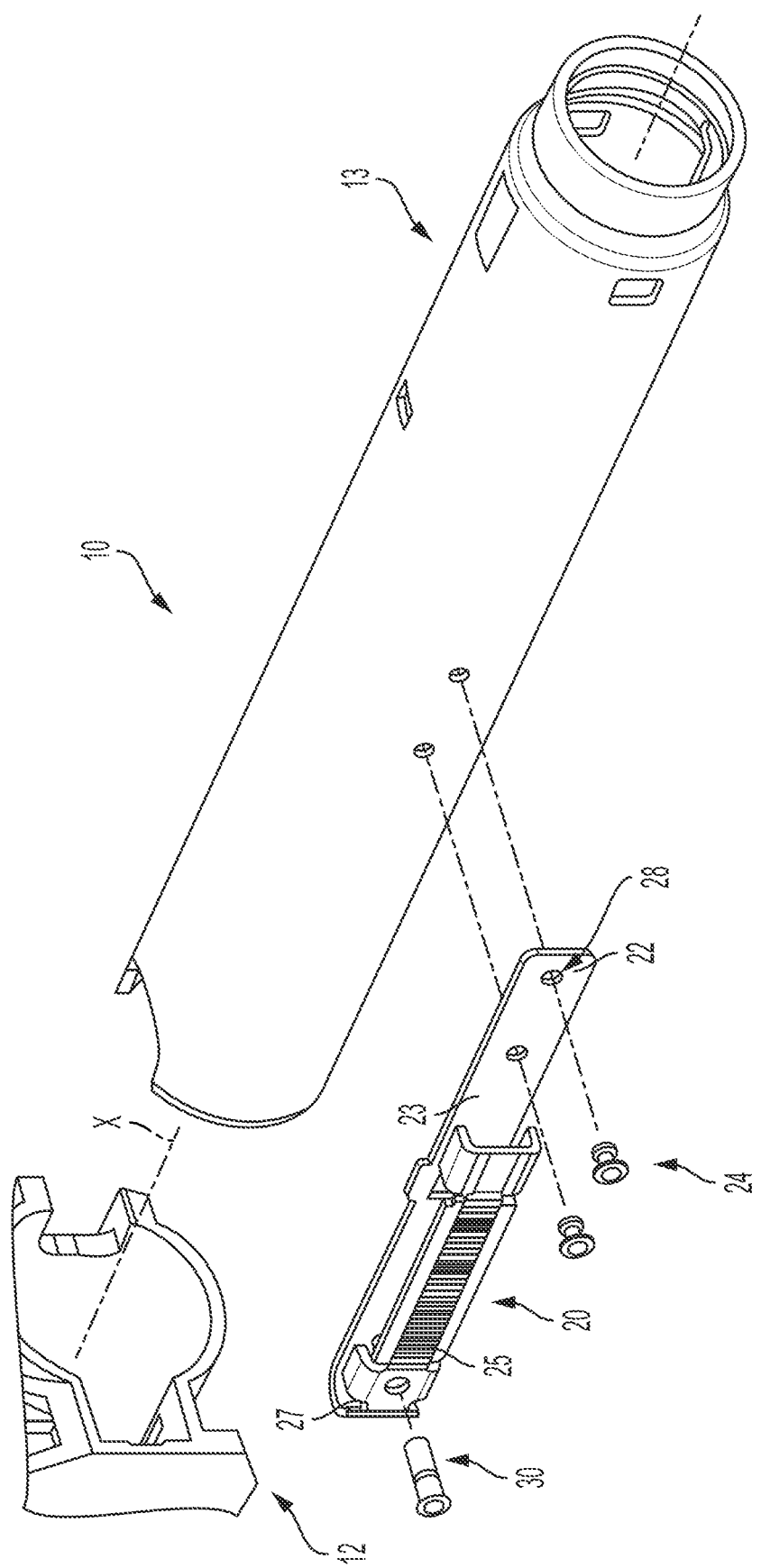
FIG. 1 is a perspective view of a steering column assembly having an energy absorption strap assembly.

FIG. 1 illustrates a steering column assembly generally indicated with numeral 10. The steering column assembly 10 is for a vehicle and extends along a longitudinal axis X. The steering column assembly 10 may be adjustable in a telescopic direction generally parallel with the longitudinal axis X (i.e., adjustable along the longitudinal axis X), and may be adjustable in a rake direction in some embodiments. The steering column assembly 10 includes a lower jacket 12 and an upper jacket 13 extending along the longitudinal axis X. The upper jacket 13 has a portion extending into the lower jacket 12 and is translatable therein. A steering shaft (not shown) is rotatably disposed within the upper jacket 13 and the lower jacket 12. The steering shaft may be one of a plurality of operatively coupled steering shafts in some embodiments. A steering wheel (not shown) is configured to be mounted to the steering shaft.

The upper jacket 13 is movable, relative to the lower jacket 12, during a normal operating condition of the vehicle to telescopically adjust a position of the steering wheel along the longitudinal axis "X." The normal operating condition (also referred to herein as a first condition of the steering column) is defined as a normal driving condition that allows adjustment of the upper jacket 13 over a predefined range of telescoping movement that is suitable for driving.

The steering column 10 is also operable in a second operating condition defined as a collapse of the upper jacket 13 during an energy absorbing event. In this condition, energy-absorbing movement (i.e., energy absorbing collapsibility) of the upper jacket 13 along the longitudinal axis "X" within the lower jacket 12 is provided. To assist with the energy absorbing process during a collapse event, and to reduce the number of components and assembly complexity, an energy absorbing strap assembly is disclosed herein. The energy absorbing strap assembly is generally referenced with numeral 20.

The energy absorption strap assembly (E/A strap assembly) 20 is operatively coupled to the upper jacket 13 to assist with the energy absorbing process during a collapse event.

The E/A strap assembly 20 includes an energy absorbing strap 22 having a first leg 23 and a second leg 25 which are oriented substantially parallel to each other in a spaced manner. The first leg 23 and the second leg 25 are joined by a curved segment 27 to form a substantially U-shaped energy absorbing strap 22. The first leg 23 extends further from the curved segment 27, relative to the distance that the second leg 25 extends from the curved segment 27. In other words, the first leg 23 is longer than the second leg 25.

The first leg 23 defines a pair of apertures 28. The energy absorbing strap 22 is directly coupled to the upper jacket 13 with one or more mechanical fasteners 24 that extend through the apertures 28 of the first leg 23. Although illustrated in a specific position, it is to be appreciated that the precise location of the apertures 28 and mechanical fastener(s) 24 may vary depending upon the particular application and on various design factors. The illustrated embodiment shows a pair of apertures 28 that the mechanical fasteners 24 couple with, however more or fewer mechanical fasteners 24 and apertures 28 is within the scope of the disclosure.

A metal pin 30 is provided to resist unrolling of the energy absorbing strap 22 up to a predetermined breakaway load. Rather than passing through one portion of the energy absorbing strap 22 and into the upper jacket 13, the metal pin 30 extends through both legs 23, 25 of the energy absorbing strap 22.

Figure 2:
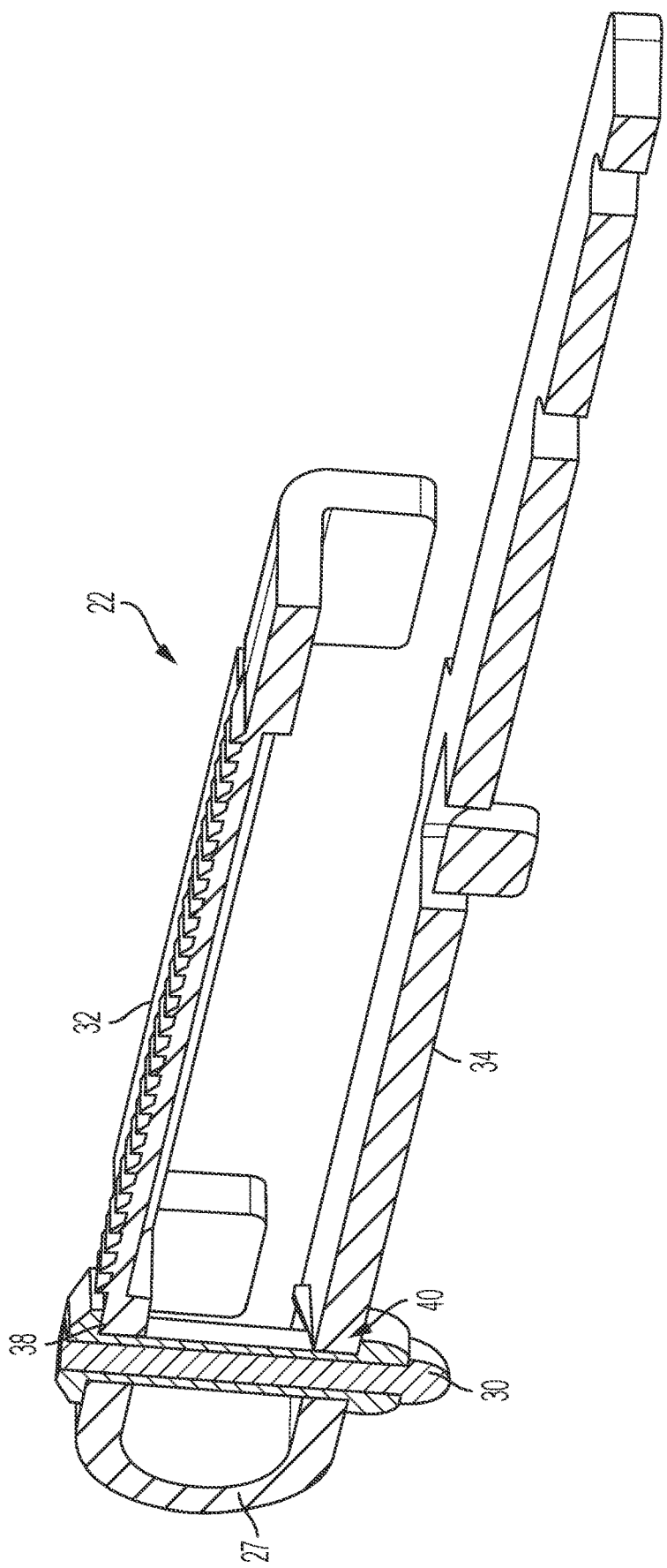
FIG. 2 is a perspective view of the energy absorption strap assembly.

As shown in FIG. 2, the energy absorbing strap 22 includes a stationary portion 32 (which corresponds to the second leg 25) and a moveable portion 34 (which corresponds to the first leg 23) that rolls during an energy absorption event. The stationary portion 32 and the moveable portion 34 are joined by the curved segment 27.

The metal pin 30 may be formed of aluminum in some embodiments, but other metals having suitable strength and fracture resistance are contemplated. The metal pin 30 may be a rivet in some embodiments. As shown, the metal pin 30 extends through the stationary portion 32 and the moveable portion 34. In particular, the stationary portion 32 includes a first hole 38 and the moveable portion 34 includes a second hole 40. The first hole 38 and the second hole 40 are aligned with each other to allow insertion of the metal pin 30 through each hole.

The metal pin 30 provides an initial breakaway load that supplements the initial load of the energy absorbing strap 22. The metal pin 30 provides a substantially higher initial breakaway load by being inserted through the stationary and moveable portions 32, 34 of the energy absorbing strap 22, and not the upper jacket 13. For example, the metal pin 30 may avoid shearing to provide an initial breakaway load of over 1000 N. In some embodiments, the metal pin 30 provides an initial breakaway load of over 1200 N, with a non-limiting example of a breakaway load range being 1200 N to 1800 N. Positioning of the metal pin 30 to connect the legs/portions 32, 34 of the energy absorbing strap 22 prevents unrolling of the energy absorbing strap 22 during an energy absorption event.

While the metal pin 30 is shown and described above in connection with a roll strap, it is to be appreciated that the metal pin 30 may benefit other types of energy absorbing straps, such as an anvil strap, for example.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a lower jacket;
   an upper jacket in telescoping engagement with the lower jacket; and
   an energy absorbing strap assembly operatively coupled to the upper jacket, the energy absorbing strap assembly comprising:
      a strap having a stationary leg and a moveable leg connected by a curved portion to form a substantially U-shape; and
      a metal pin extending through the stationary leg and the moveable leg.

2. The steering column assembly of claim 1, wherein the metal pin is formed of aluminum.

3. The steering column assembly of claim 1, wherein the metal pin does not extend into the upper jacket.

4. The steering column assembly of claim 1, wherein the moveable leg defines at least one aperture for receiving a mechanical fastener that directly couples the moveable leg to the upper jacket.

5. The steering column assembly of claim 1, wherein the metal pin resists movement of the moveable leg, relative to the stationary leg, in response to a force over 1000 N.

6. The steering column assembly of claim 5, wherein the metal pin resists movement of the moveable leg, relative to the stationary leg, in response to a force between 1200 N and 1800 N.

7. The steering column assembly of claim 1, wherein the moveable leg is longer than the stationary leg.

8. The steering column assembly of claim 1, wherein the metal pin is a rivet.

9. A steering column assembly comprising:
   a lower jacket;
   an upper jacket in telescoping engagement with the lower jacket; and
   an energy absorbing strap assembly operatively coupled to the upper jacket, the energy absorbing strap comprising:
      a strap having a stationary leg and a moveable leg connected by a curved portion to form a substantially U-shape; and
      a metal rivet extending through the stationary leg and the moveable leg, wherein the metal rivet does not extend into the upper jacket.

10. The steering column assembly of claim 9, wherein the metal rivet is formed of aluminum.

11. The steering column assembly of claim 9, wherein the moveable leg defines at least one aperture for receiving a mechanical fastener that directly couples the moveable leg to the upper jacket.

12. The steering column assembly of claim 9, wherein the metal rivet resists movement of the moveable leg, relative to the stationary leg, in response to a force over 1000 N.

13. The steering column assembly of claim 12, wherein the metal rivet resists movement of the moveable leg, relative to the stationary leg, in response to a force between 1200 N and 1800 N.

14. The steering column assembly of claim 9, wherein the moveable leg is longer than the stationary leg.

15. An energy absorbing strap assembly for a vehicle steering system, the energy absorbing strap assembly comprising:
- a strap having a stationary leg and a moveable leg connected by a curved portion to form a substantially U-shape; and
- a metal pin extending through the stationary leg and the moveable leg.

16. The energy absorbing strap assembly of claim 15, wherein the metal pin is a metal rivet.

17. The energy absorbing strap assembly of claim 15, wherein the metal pin resists movement of the moveable leg, relative to the stationary leg, in response to a force over 1000 N.

18. The energy absorbing strap assembly of claim 15, wherein the metal pin is aluminum.

\* \* \* \* \*